US011073210B2

(12) United States Patent
Hintenlang et al.

(10) Patent No.: US 11,073,210 B2
(45) Date of Patent: Jul. 27, 2021

(54) SEALING ELEMENT

(71) Applicant: CARL FREUDENBERG KG, Weinheim (DE)

(72) Inventors: Guenter Hintenlang, Abtsteinach (DE); François Colineau, Weinheim (DE); Martin Heldmann, Lindenfels (DE); Frank Guder, Frankenthal (DE); Jens Hofmann, Mannheim (DE)

(73) Assignee: Carl Freudenberg KG, Weinheim (DE)

(*) Notice: Subject to any disclaimer, the term of this patent is extended or adjusted under 35 U.S.C. 154(b) by 147 days.

(21) Appl. No.: 16/587,417

(22) Filed: Sep. 30, 2019

(65) Prior Publication Data
US 2020/0103029 A1 Apr. 2, 2020

(30) Foreign Application Priority Data

Oct. 1, 2018 (DE) .......................... 102018124256.5

(51) Int. Cl.
*F16J 15/32* (2016.01)
*F16J 15/06* (2006.01)
*F16C 3/02* (2006.01)
*F16J 15/00* (2006.01)
*F16J 15/3268* (2016.01)
*F16J 15/3284* (2016.01)

(52) U.S. Cl.
CPC ............ *F16J 15/064* (2013.01); *F16C 3/023* (2013.01); *F16J 15/002* (2013.01); *F16J 15/3268* (2013.01); *F16J 15/3284* (2013.01); *F16C 2202/32* (2013.01)

(58) Field of Classification Search
CPC ...... F16J 15/064; F16J 15/002; F16J 15/3268; F16J 15/3284; F16C 3/023; F16C 2202/32

See application file for complete search history.

(56) References Cited

U.S. PATENT DOCUMENTS

| 4,844,485 A | 7/1989 | Antonini et al. |
| 6,830,641 B2 | 12/2004 | Kosty et al. |
| 7,384,494 B2 | 6/2008 | Kosty et al. |

(Continued)

FOREIGN PATENT DOCUMENTS

| DE | 29916854 | 1/2000 |
| DE | 10293217 | 4/2004 |

(Continued)

OTHER PUBLICATIONS

Official Action for German Patent Application No. 102018124257.3, dated May 21, 2019, 6 pages.

(Continued)

*Primary Examiner* — Gilbert Y Lee
(74) *Attorney, Agent, or Firm* — Sheridan Ross P.C.

(57) ABSTRACT

Sealing element for producing an electrically conductive connection between a first machine element and a second machine element, including at least one sealing disc and a support ring, the support ring comprising an axial flange and a radial flange, the sealing disc being formed from an electrically conductive non-woven fabric, and the sealing disc being secured at least in sections along the axial flange by means of a clamping connection between the support ring and the second machine element.

12 Claims, 9 Drawing Sheets

(56) References Cited

U.S. PATENT DOCUMENTS

| | | | |
|---|---|---|---|
| 1,016,152 | A1 | 7/2014 | Colineau et al. |
| 1,019,069 | A1 | 1/2016 | Colineau et al. |
| 2004/0232620 | A1* | 11/2004 | Bock ..................... G01M 3/045 277/320 |
| 2014/0203514 | A1* | 7/2014 | Colineau .............. F16J 15/3232 277/353 |
| 2015/0226332 | A1 | 8/2015 | Girardot et al. |
| 2016/0010750 | A1* | 1/2016 | Colineau .............. F16J 15/3232 277/565 |
| 2018/0313449 | A1 | 11/2018 | Dahlhaus-Preussler et al. |
| 2020/0103028 | A1 | 4/2020 | Hintenlang et al. |

FOREIGN PATENT DOCUMENTS

| | | |
|---|---|---|
| DE | 102013000982 | 7/2014 |
| DE | 102014010269 | 1/2016 |
| DE | 102015224042 | 6/2017 |
| DE | 102016010926 | 9/2017 |
| DE | 102017004061 | 10/2018 |
| EP | 3396216 | 10/2018 |
| JP | S60-175957 | 11/1985 |
| JP | H01-34782 | 10/1989 |
| WO | WO 2018/220031 | 12/2018 |

OTHER PUBLICATIONS

Extended Search Report for European Patent Application No. 19200166.7, dated Mar. 3, 2020, 8 pages.

Extended Search Report for European Patent Application No. 19200168.3, dated Mar. 3, 2020, 8 pages.

\* cited by examiner

SEALING ELEMENT

CROSS-REFERENCE TO RELATED APPLICATIONS

This application claims the benefit of German Patent Application No. 10 2018 124 256.5 filed Oct. 1, 2018, the entire disclosure of which is incorporated herein by reference in its entirety.

FIELD

The invention relates to a sealing element for producing an electrically conductive connection between a first machine element and a second machine element, comprising at least one sealing disc and a support ring, wherein the sealing disc is formed from an electrically conductive non-woven fabric.

BACKGROUND

DE 10 2013 000 982 A1 discloses a seal, comprising a sealing ring having at least one dynamically stressed sealing lip and a buffer seal. The buffer seal is arranged adjacent to the sealing lip at an axial spaced disposition and consists of an electrically conductive material. The sealing lip and the buffer seal surround, in a sealing manner, a surface—to be sealed—of a first machine element. The first machine element is arranged adjacent to a second machine element at a radial spaced disposition. The sealing ring and the buffer seal are arranged in the gap formed by the radial spaced disposition. The first machine element and the second machine element are connected together in an electrically conductive manner by the buffer seal. For this purpose, the buffer seal is adjacent to and in contact with both the first machine element and the second machine element. The buffer seal is formed as a potential-equalising ring and consists of an electrically conductive non-woven fabric impregnated with PTFE.

The buffer seal effects potential equalisation between the two machine elements and prevents mechanical damage, which can occur when electrical potentials of different magnitude of the machine elements are equalised by an electrical breakdown. An electrical breakdown can cause material to be removed from the machine element with a relatively low charge and a change in the material microstructure in the region in which the electrical breakdown occurs.

A further buffer seal is known from DE 10 2014 010 269 A1. The buffer seal comprises a circular ring-shaped disc consisting of an electrically conductive and air-permeable material and a support body, the disc being formed separately and being connected to the support body. The support body is formed by a sealing ring.

In the previously known seals, the electrically conductive sealing element is secured in an integrally bonded manner along the end face of the radial flange of the sealing ring.

SUMMARY

The object of the invention is to provide a sealing element of the type mentioned in the introduction, which can be produced in a simple and cost-effective manner.

This object is achieved by the features of claim 1. The dependent claims refer to advantageous embodiments.

In order to achieve the object, the sealing element includes at least one sealing disc and a support ring, the support ring comprising an axial flange and a radial flange, the sealing disc being formed from an electrically conductive non-woven fabric, and the sealing disc being secured at least in sections along the axial flange by means of a clamping connection between the support ring and the second machine element. A clamping connection of the sealing disc and the support ring can be produced in a particularly simple manner. In particular, pre-treatment steps for the support ring and/or sealing disc can be omitted, these steps being required in most cases for connecting the sealing disc to the support ring in an integrally bonded manner. The sealing disc is formed from electrically conductive material and is positioned relative to the support ring such that a clamping connection is produced which fixes the sealing disc in position.

In accordance with the invention, the sealing disc extends at least in sections along the axial flange of the support ring. In this embodiment, the sealing disc is pressed not only in the axial direction but also in the radial direction. Depending upon the design of the support ring, the sealing disc can be pressed directly against the inner wall of the second machine element. It is advantageous that direct contact of the sealing disc against the second machine element is provided, wherein a comparatively large contact surface for electrical contacting is produced.

In the section in which the sealing disc is secured between the support ring and the second machine element, the sealing disc can be compressed between 5% and 50% of the initial thickness. Preferably, the compression is between 10% and 30% of the initial thickness. The term "initial thickness" is to be understood to mean the thickness of the sealing disc in the unmounted state. Owing to the clamping connection, the sealing disc is compressed and so the thickness of the sealing disc is reduced. In this respect, the thickness of the sealing disc in the clamped section is between 70% and 90% of the initial thickness. This compression produces a secure clamping connection, which prevents the sealing disc from being detached from the sealing element. Furthermore, the surface of the sealing disc comes into close contact with the wall of the support ring and the second machine element, whereby improved electrical conductivity between the sealing disc and the second machine element is produced.

In order to increase the clamping force locally, the support ring can be provided with a pressing contour. The pressing contour can be formed e.g. in the manner of a circumferential bead which protrudes from the axial flange on the outer peripheral side. Alternatively, it is also feasible to provide a circumferential protrusion along the axial flange.

A pressing element can also be provided in the region in which the sealing disc is clamped. The pressing element can be formed from an O-ring. The pressing element can be arranged between the sealing disc and the support ring or between the sealing disc and the second machine element. The sealing disc is compressed to a greater extent in the region of the pressing element, which is associated with an improved clamping effect.

The sealing disc can be secured between the sealing ring and the second machine element. In this embodiment, the second machine element preferably comprises a step with a radial shoulder. The support ring is preferably L-shaped and includes a radial flange and an axial flange. The axial flange is arranged on the radial flange on the outer peripheral side. In this embodiment, a clamping connection is formed between the radial shoulder of the second machine element and the support ring. The sealing disc is clamped between the sealing ring and the second machine element.

Preferably, the sealing disc extends along the radial flange and at least in sections along the axial flange of the support ring. In this case, the sealing disc connects the first machine element and the second machine element. In this case, it is not necessary for the support ring to be designed in an electrically conductive manner. The sealing disc lies with a radial bias against the first machine element, wherein the sealing disc bulges in the axial direction in sections after mounting. As a result, an electrically conductive connection of the sealing disc and the first machine element is produced.

The electrically conductive connection of the sealing disc and the second machine element is produced in this embodiment by virtue of the fact that the sealing disc is pressed by the clamping connection directly against the second machine element or against the radial shoulder of the second machine element.

The axial flange of the support ring can comprise a step and so the section of the axial flange associated with the radial flange has a smaller diameter than the section associated with the free end. A space for receiving the sealing disc is produced by the reduction in cross-section. Excessive compression of the sealing disc is prevented by the receiving space. The sealing disc is pressed by the step and so the thickness of the sealing disc in the region of the step is reduced between 10% and 30% compared with the initial thickness of the sealing disc. At the same time, the free end of the axial flange lies directly against the second machine element and so it is possible to transfer force directly between the support ring and the second machine element and the sealing disc is arranged in the force shunt.

The support ring can comprise an inner ring and an outer ring, wherein the sealing disc is secured between the inner ring and the outer ring. In this embodiment, the clamping connection is produced between the inner ring and outer ring. The advantage is that the sealing element together with the sealing disc can be formed as a pre-mounted unit. In this embodiment, at least the outer ring is formed in an electrically conductive manner. In this embodiment, the sealing disc is compressed between the inner ring and the outer ring. Preferably, the sealing disc, the inner ring and the outer ring are configured such that the sealing disc is compressed between 10% to 30% of the initial thickness of the sealing discs in the clamped region.

The inner ring and the outer ring each comprise a radial flange and an axial flange, wherein the outer diameter of the axial flange of the inner ring substantially corresponds to the inner diameter of the axial flange of the outer ring. Proceeding from the support ring, the sealing disc extends radially inwards and lies with elastic bias in a sealing manner on the outer peripheral side of the first machine element. The sealing disc bulges in an axial direction which opposes the extension of the axial flange of the support ring.

The free end of the axial flange of the outer ring can be bent radially inwards and at least partially cover the axial flange of the inner ring. As a result, the inner ring can be prevented from being detached from the outer ring.

The inner ring can have a tapering cross-section at the section of the axial flange associated with the radial flange. A receiving space in which the sealing disc can extend is produced by the tapering cross-section. In this embodiment, the sealing disc can extend along the radial flange of the inner ring and outer ring and also in sections along the axial flange of the inner ring and outer ring.

The support ring can comprise at least one intermediate ring, wherein a first sealing disc is secured between the inner ring and the intermediate ring and at least one second sealing disc is secured between the intermediate ring and the outer ring. Depending upon the design, a plurality of intermediate rings can be provided, wherein a sealing disc is arranged in each case between the inner ring, the individual intermediate rings and the outer ring. Sealing discs which consist of mutually different materials can be provided.

The sealing discs secured between the inner ring, the intermediate ring and the outer ring lie with radial bias on the first machine element and bulge in an axial direction. At least one of the two sealing discs is designed in an electrically conductive manner. Likewise, the outer ring is electrically conductive. Furthermore, the inner ring and/or the intermediate ring can also be electrically conductive.

In one advantageous embodiment, one sealing disc can be electrically conductive, the second sealing disc has soft magnetic fittings and acts as an electromagnetic shield to shield against interfering electromagnetic waves. Alternatively, it is also feasible for the inner ring or the intermediate ring to have such soft magnetic fittings. In this respect, the embodiment of the sealing element having two sealing discs permits the production of an electrically conductive connection between the first machine element and the second machine element and—with corresponding fittings—also permits shielding against interfering electromagnetic waves. By virtue of the fact that a plurality of sealing discs are provided, the sealing effect is also improved.

It is also feasible in this embodiment for the axial flange of the outer ring to be flattened down inwardly at its free end and thus cover the axial flange of the inner ring, and so the sealing discs and the intermediate ring are clamped between the inner ring and outer ring, wherein the inner ring is locked on the outer ring in a form-fitting manner. A radial shaft sealing ring can be arranged on the inner ring. This is preferably secured on the radially inner free end of the radial flange of the inner ring.

Alternatively, an elastomer track can be arranged on the inner ring. A radial shaft sealing ring can be formed from the elastomer track. Furthermore, the elastomer track can cover the end face of the radial flange associated with the outer ring and the surface of the axial flange associated with the second machine element. In the region of the axial flange, the elastomer track forms a static seal. The elastomer track clamps the sealing disc between the inner ring and the outer ring. A receptacle can be formed from the elastomer track, in which the sealing disc can be arranged. As a result, excessive compression of the sealing disc is prevented.

The sealing disc can comprise electrically conductive particles. The electrically conductive particles provide the electrical conductivity of the sealing disc. Preferably, the electrically conductive particles are formed as fibres, wherein in a particularly preferred manner electrically conductive fibres having a length of at least 10 mm are used. Such comparatively long fibres can permit a direct transfer of the electric current, and so the sealing disc has a comparatively low electrical resistance. Furthermore, it is advantageous that the fibres can come into direct contact with the first machine element and the second machine element.

The sealing disc formed of non-woven fabric is preferably saturated with the PTFE dispersion. As a result, the non-woven fabric is stabilised and the frictional coefficient is reduced compared with the first machine element. As a result, the service life of the sealing element is extended.

BRIEF DESCRIPTION OF THE DRAWINGS

Some embodiments of the sealing element according to the invention will be explained in more detail hereinunder with the aid of the figures. The figures show, in each case schematically.

DETAILED DESCRIPTION

Figure 1:
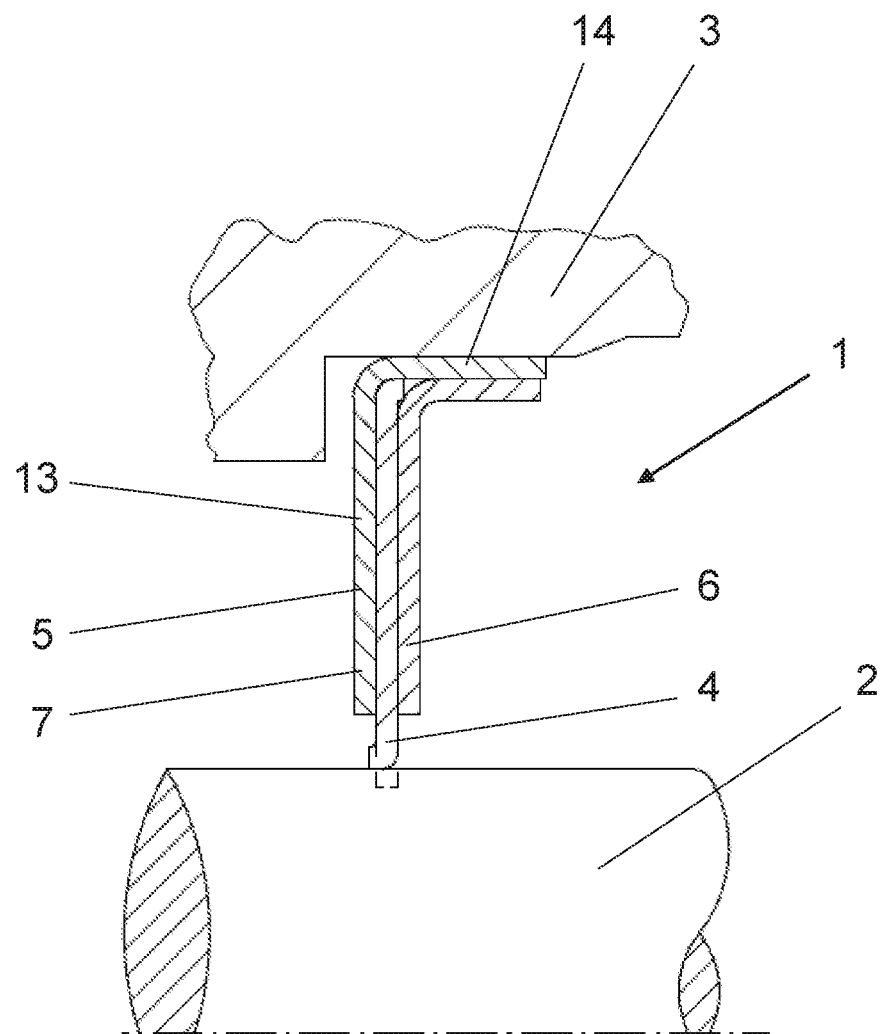
FIG. 1 a sectional view of a sealing element, the support ring of which has an inner ring and an outer ring.

The figures show a sealing element 1 for producing an electrically conductive connection between a first machine element 2 and a second machine element 3. In the present embodiments, the first machine element 2 is a rotating shaft and the second machine element 3 is a housing. The first machine element 2 and the second machine element 3 can be a component of an electric drive of a motor vehicle.

The sealing element 1 includes at least one sealing disc 4 and a support ring 5. At least the sealing disc 4 consists of an electrically conductive material. In the present embodiment, the sealing disc 4 is formed from a non-woven fabric saturated with PTFE and contains electrically conductive particles in the form of metallic fibres. Further advantageous electrically conductive particles can consist of conductive carbon black or metal particles. The sealing disc 4 is secured to the support ring 5 by means of a clamping connection.

In the embodiment of FIG. 1, the support ring 5 includes an inner ring 6 and an outer ring 7, wherein the sealing disc 4 is secured between the inner ring 6 and the outer ring 7. In this embodiment, at least the outer ring 7 is formed of electrically conductive material. Preferably, the inner ring 6 and the outer ring 7 are formed as punched parts and consist of metallic material. The sealing disc 4 is clamped between the inner ring 6 and the outer ring 7 and is fixed in position there. The inner ring 6 and the outer ring 7 each comprise a radial flange 13 and an axial flange 14, wherein the outer diameter of the axial flange 14 of the inner ring 6 substantially corresponds to the inner diameter of the axial flange 14 of the outer ring 7. The inner diameter and outer diameter are selected such that a press-fit arrangement is produced, and so the inner ring 6, the sealing disc 4 and the outer ring 7 are fitted one inside the other in a captive manner. In this embodiment, the radial flange of the outer ring 7 lies against the radial shoulder of the second machine element 3.

Figure 2:
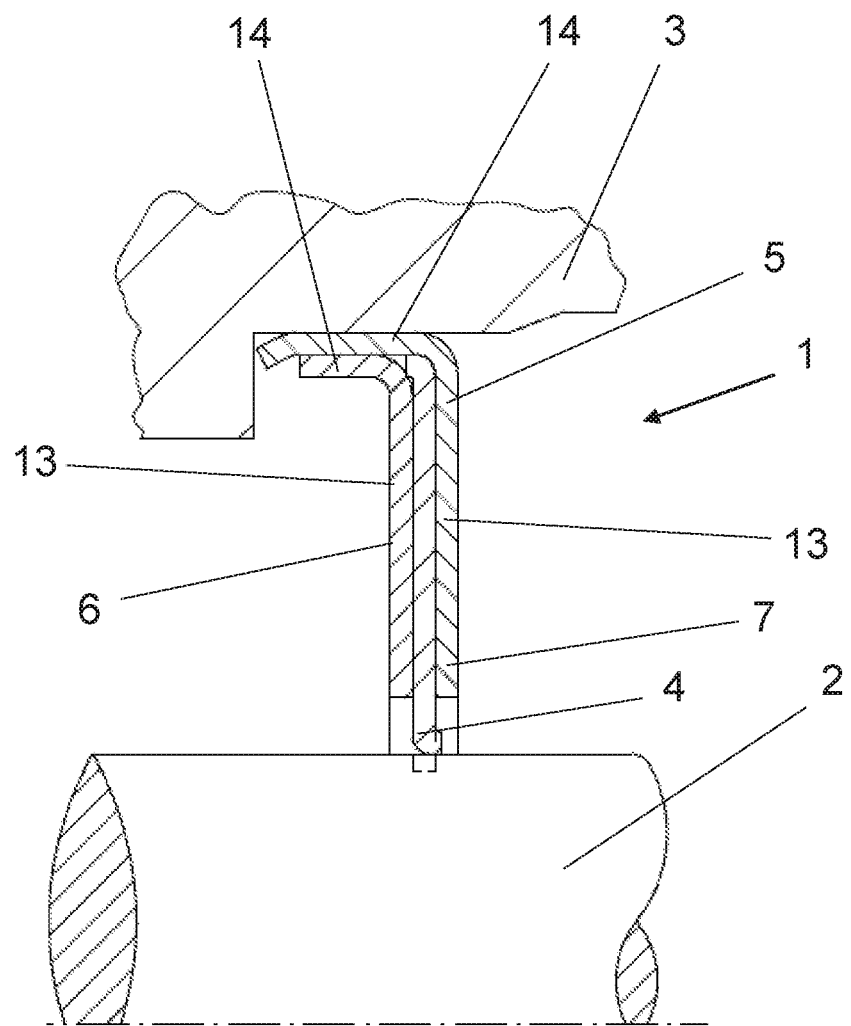
FIG. 2 a sealing element of FIG. 1 with a form-fitting connection of the inner ring and the outer ring.
Figure 3:
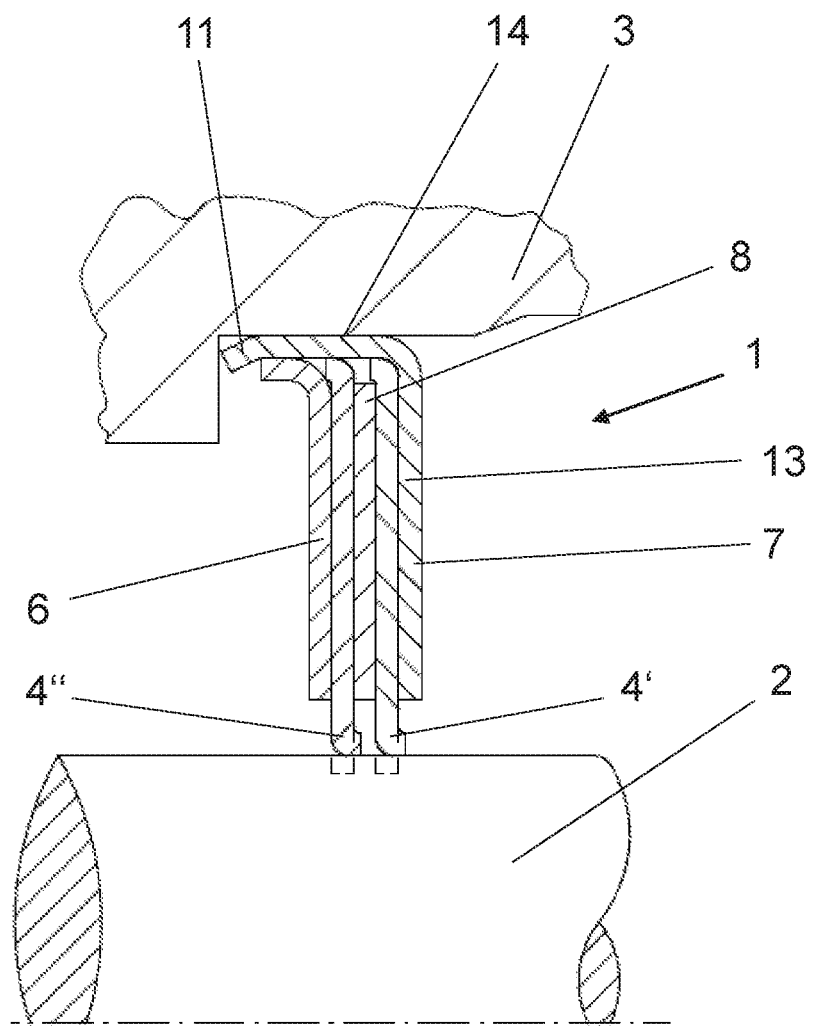
FIG. 3 a sealing element having an intermediate ring and two sealing discs.

FIG. 2 shows an alternative embodiment of the sealing element 1 shown in FIG. 3. In this embodiment, the free end 11 of the axial flange 14 of the outer ring 7 is bent radially inwards. For this purpose, the free end 11 is flattened down inwards after mounting the sealing disc 4 and the inner ring 6. As a result, the inner ring 6 is locked in the outer ring 7 in a form-fitting manner. Furthermore, owing to the tapering cross-section produced thereby in the region of the free end 11, it is possible to position the sealing element 1 in the second machine element 3 such that the free end 11 lies against the radial shoulder of the second machine element 3.

FIG. 3 shows a sealing element 1 in which the support ring 5 includes an intermediate ring 8. A first sealing disc 4' is secured between the inner ring 6 and the intermediate ring 8 and a second sealing disc 4" is secured between the intermediate ring 8 and the outer ring 7.

In this embodiment, at least the outer ring 7 is formed of electrically conductive material. Preferably, the inner ring 6, the intermediate ring 8 and the outer ring 7 are formed as punched parts and consist of metallic material. The two sealing discs 4', 4" are clamped between the inner ring 6 and the intermediate ring 8 and between the intermediate ring 8 and the outer ring 7 and are fixed in position there. The inner ring 6 and the outer ring 7 each comprise a radial flange 13 and an axial flange 14, wherein the outer diameter of the axial flange 14 of the inner ring 6 substantially corresponds to the inner diameter of the axial flange 14 of the outer ring 7. The inner diameter and the outer diameter are selected such that a press-fit arrangement is produced, and so the inner ring 6, the intermediate ring 8, the sealing discs 4', 4" and the outer ring 7 are fitted one inside the other in a captive manner. In this embodiment, the radial flange 13 of the outer ring 7 lies against the radial shoulder of the second machine element 3.

In this embodiment, the free end 11 of the axial flange 14 of the outer ring 7 is bent radially inwards. For this purpose, the free end 11 is flattened down inwards after mounting the sealing disc 4 and the inner ring 6. As a result, the inner ring 6 is locked in the outer ring 7 in a form-fitting manner. Furthermore, owing to the tapering cross-section produced thereby in the region of the free end 11, it is possible to position the sealing element 1 in the second machine element 3 such that the free end 11 lies against the radial shoulder of the second machine element 3.

The inner ring 6, the intermediate ring 8 and the outer ring 7 are electrically conductive. Furthermore, at least one sealing disc 4' is electrically conductive. It is feasible for the two sealing discs 4', 4" to be designed to be electrically conductive. Alternatively, only one sealing disc 4' is designed to be electrically conductive and the other sealing disc 4" is formed from a soft magnetic material. In this case, the other sealing disc 4" forms a shield against interfering electromagnetic radiation.

Figure 4:
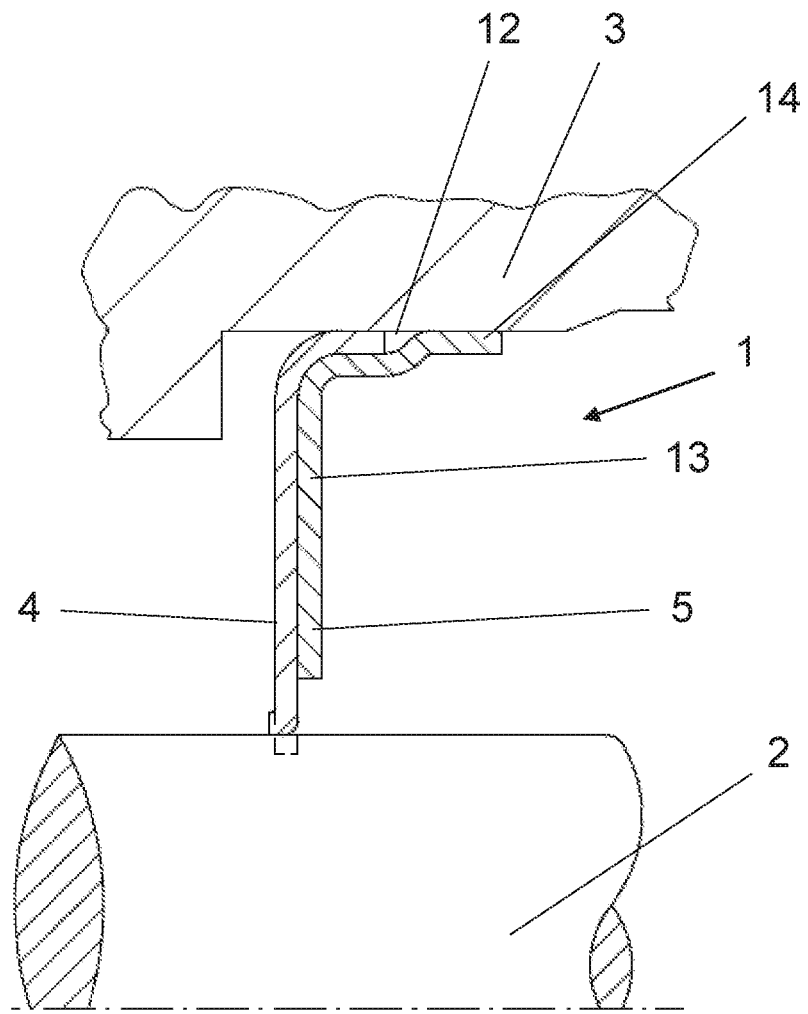
FIG. 4 a sectional view of a sealing element, wherein the sealing disc is clamped between the support ring and the housing.

In the embodiment of FIG. 4, the sealing disc 4 is secured between the support ring 5 and the second machine element 3. On the end face, the sealing disc 4 lies against the radial flange 13 of the support ring 5 and also extends in sections on the outer peripheral side over the axial flange 14 of the support ring 5. A radial shoulder is formed from the second machine element 3, the housing, wherein the sealing disc 4 is clamped, after mounting, between the radial shoulder of the second machine element 3 and the support ring 5 and is fixed in position thereby.

The support ring 5 comprises a step which produces a space 12 for receiving the sealing disc 4. The step is formed such that the sealing disc 4 is clamped between the support ring 5 and the second machine element 3, in this case a housing, wherein the sealing disc 4 is compressed by 20% compared with the initial thickness of the sealing disc 4. As a result, the thickness of the sealing disc 4 in the clamped region is 80% of the initial thickness.

In this embodiment, the sealing disc 4 forms a dynamic seal with respect to the first machine element 2 and a static seal with respect to the second machine element 3. Furthermore, the sealing disc 4 extends from the first machine element 2 to the second machine element 3 and so the electrically conductive connection can occur exclusively via the sealing disc 4. In this respect, it is not necessary in this embodiment for the support ring 5 to consist of electrically conductive material. In this respect, it is feasible to form the support ring 5 from plastic, preferably plastic which can be injection moulded.

Figure 5:
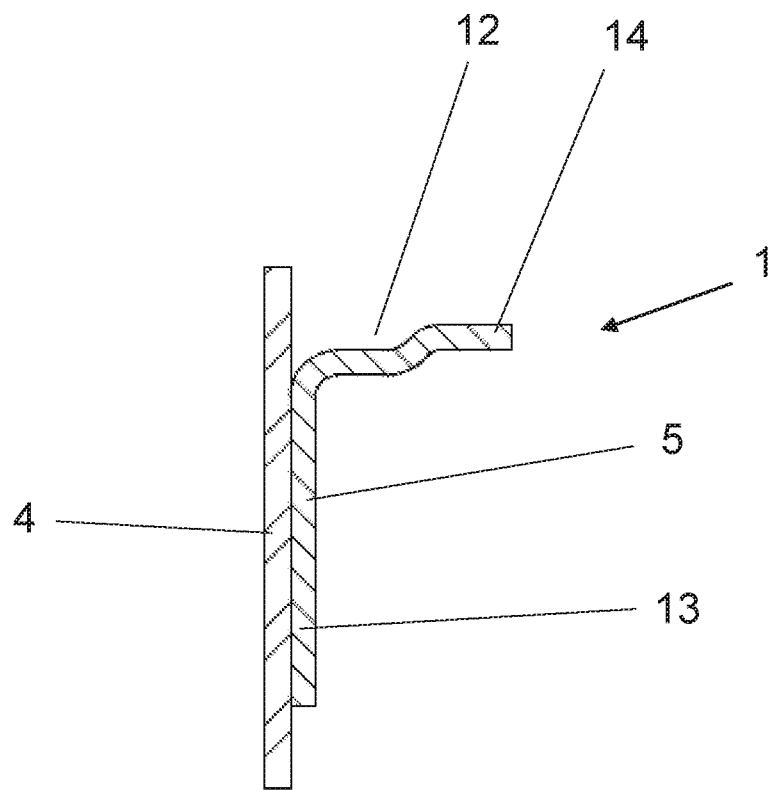
FIG. 5 the sealing element shown in FIG. 4 prior to mounting.

FIG. 5 shows an embodiment of the sealing element 1 shown in FIG. 1 prior to mounting. In this embodiment, the sealing disc 4 is positively connected to the end face of the radial flange 13 of the support ring 5 and so the sealing disc 4 and the support ring 5 are captively connected together.

Figure 6:
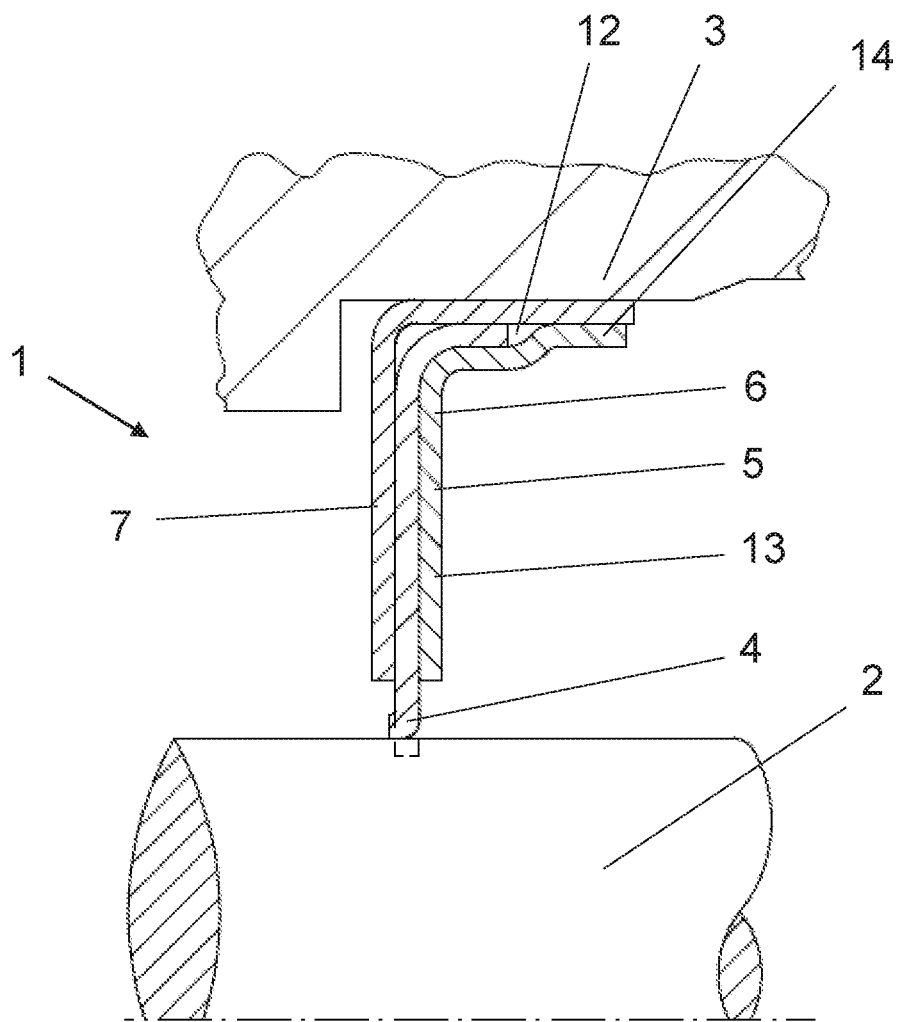
FIG. 6 a sealing element of FIG. 5 with an additional space for receiving the sealing disc.

FIG. 6 shows a further alternative embodiment of the sealing element 1 shown in FIG. 3. In the embodiment of FIG. 6, the support ring 5 includes an inner ring 6 and an outer ring 7, wherein the sealing disc 4 is secured between the inner ring 6 and the outer ring 7. In this embodiment, at least the outer ring 7 is formed of electrically conductive material. Preferably, the inner ring 6 and the outer ring 7 are formed as punched parts and consist of metallic material. The sealing disc 4 is clamped between the inner ring 6 and the outer ring 7 and is fixed in position there. The inner ring 6 and the outer ring 7 each comprise a radial flange 13 and an axial flange 14, wherein the outer diameter of the axial flange 14 of the inner ring 6 substantially corresponds to the inner diameter of the axial flange 14 of the outer ring 7. The inner diameter and outer diameter are selected such that a press-fit arrangement is produced, and so the inner ring 6, the sealing disc 4 and the outer ring 7 are fitted one inside the other in a captive manner. In this embodiment, the radial flange 13 of the outer ring 7 lies against the radial shoulder of the second machine element 3. In this embodiment, a tapering cross-section is also formed in the region of the axial flange 14 of the inner ring 6 and adjoins the radial flange 13 of the inner ring 6. As a result, a space 12 for receiving the sealing disc 4 is formed between the inner ring 6 and outer ring 7.

Figure 7:
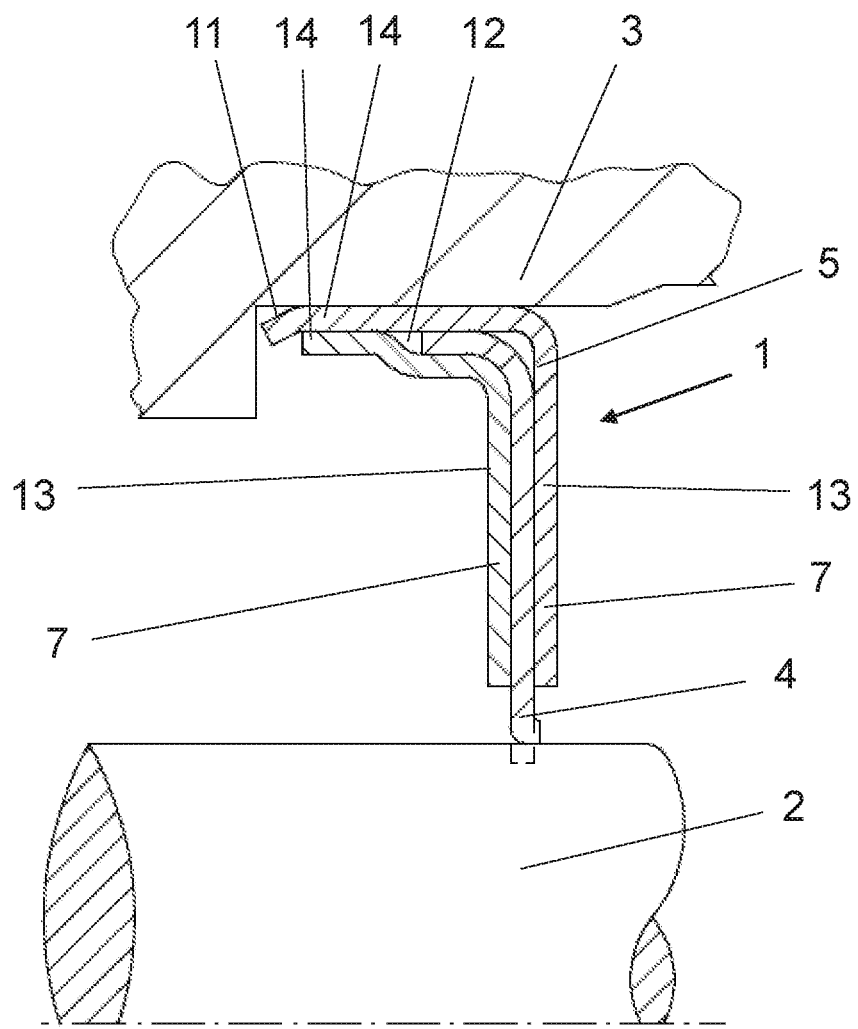
FIG. 7 a sealing element of FIG. 6 with a form-fitting connection of the inner ring and the outer ring.

The embodiment of FIG. 7 shows a development of the sealing element 1 shown in FIG. 6. In this embodiment, the free end 11 of the axial flange 14 of the outer ring 7 is bent radially inwards. For this purpose, the free end 11 is flattened down inwards after mounting the sealing disc 4 and the inner ring 6. As a result, the inner ring 6 is locked in the outer ring 7 in a form-fitting manner. Furthermore, owing to the tapering cross-section produced thereby in the region of the free end 11, it is possible to position the sealing element 1 in the second machine element 3 such that the free end 11 lies against the radial shoulder of the second machine element 3. Furthermore, a tapering cross-section is formed in the region of the axial flange 14 of the inner ring 6 and adjoins the radial flange 13 of the inner ring 6. As a result, a space 12 for receiving the sealing disc 4 is formed between the inner ring 6 and outer ring 7.

Figure 8:
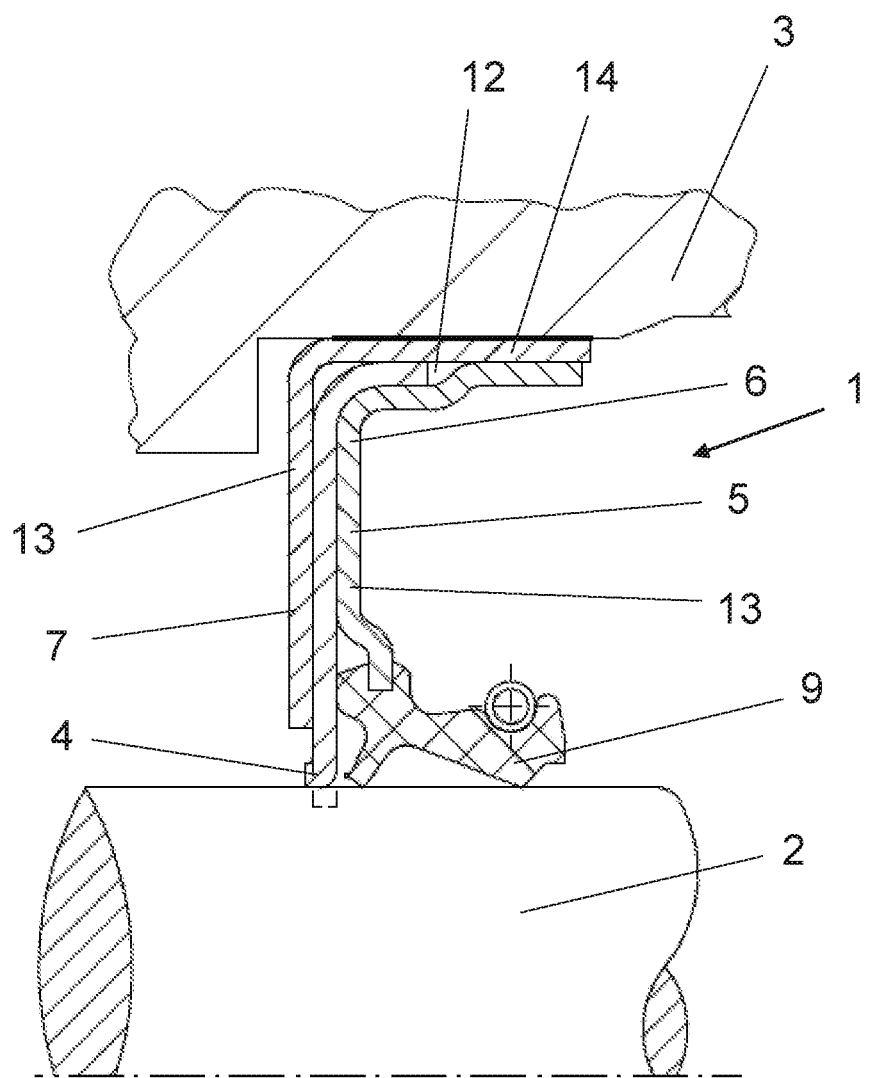
FIG. 8 a sealing element having a radial shaft sealing ring integrally formed on the inner ring.

FIG. 8 shows a development of the sealing element 1 shown in FIG. 6. In this embodiment, a radial shaft sealing ring 9 is arranged on the end of the radial flange 13 of the inner ring 6, which end is associated with the first machine element 2. The radial shaft sealing ring 9 consists of elastomeric material and is integrally formed directly on the inner ring 6. The radial shaft sealing ring 9 comprises a sealing lip, which is pressed against the first machine element 2 by means of an annular spiral coiled spring with radial bias.

Figure 9:
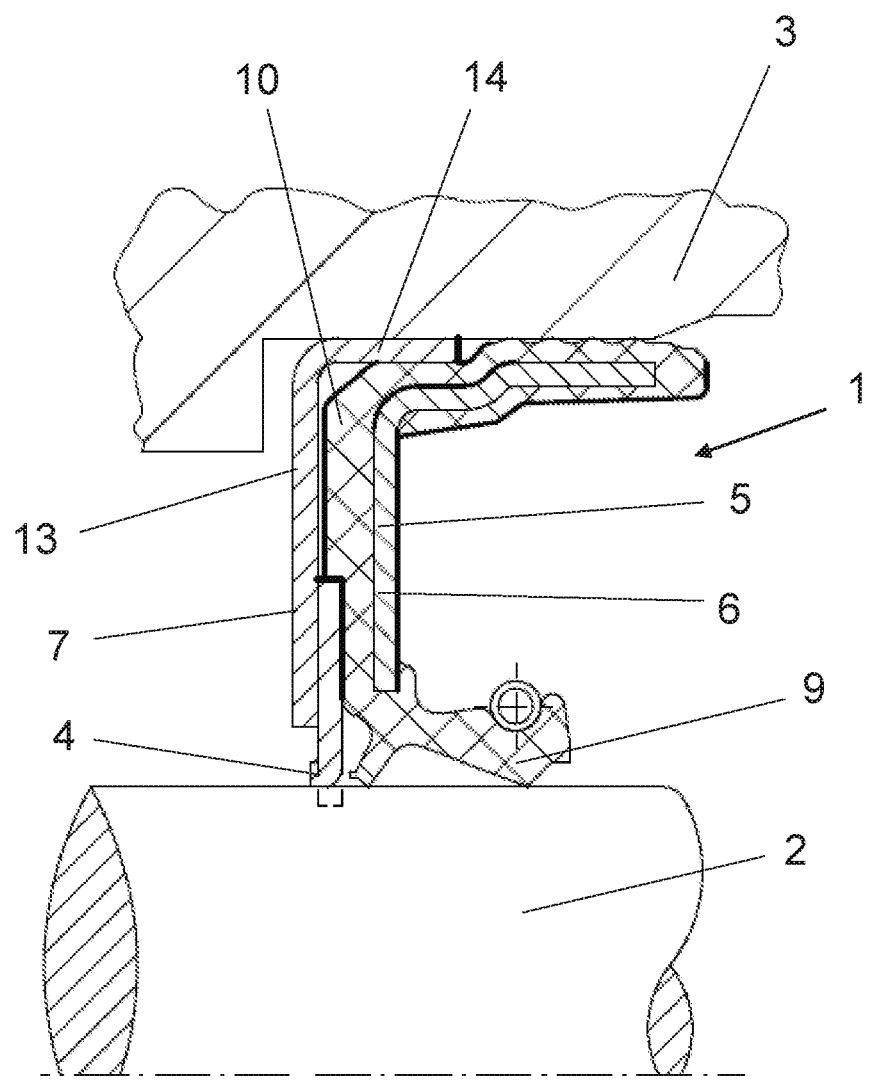
FIG. 9 a sealing element having an elastomer track integrally formed on the inner ring.

FIG. 9 shows an alternative development of the sealing element 1 shown in FIG. 6. In this embodiment, an elastomer track 10 is arranged on the inner ring 8. The elastomer track 10 extends along the end face of the inner ring 6 facing the outer ring 7 and extends from the radial flange 13 to beyond the axial flange 14. In the region of the axial flange 14, the elastomer track 10 comes into contact with the second machine element 3 and forms a static seal. The elastomer track 10 forms a receptacle for the sealing disc 4 on the end face facing the outer ring 7. A radial shaft sealing ring 9 is formed from the elastomer track 10. The radial shaft sealing ring 9 consists of elastomeric material and is integrally formed directly on the inner ring 6. The radial shaft sealing ring 9 comprises a sealing lip, which is pressed against the first machine element 2 by means of an annular spiral coiled spring with radial bias.

What is claimed is:

1. A sealing element for producing an electrically conductive connection between a first machine element and a second machine element, including at least one sealing disc and a support ring, the support ring comprising an axial flange and a radial flange, the sealing disc being formed from an electrically conductive non-woven fabric, and the sealing disc being secured at least in sections along the axial flange by means of a clamping connection between the support ring and the second machine element.

2. The sealing element as claimed in claim 1, wherein in the section in which the sealing disc is secured between the support ring and the second machine element, the sealing disc is compressed between 5% to 50% of the initial thickness.

3. The sealing element as claimed in claim 1, wherein the support ring includes an inner ring and an outer ring, wherein the sealing disc is secured between the inner ring and the outer ring.

4. The sealing element as claimed in claim 3, wherein the support ring includes at least one intermediate ring, wherein a first sealing disc is secured between the inner ring and the intermediate ring and at least one second sealing disc is secured between the intermediate ring and the outer ring.

5. The sealing element as claimed in claim 4, wherein the outer ring is electrically conductive.

6. The sealing element as claimed in claim 5, wherein the first sealing disc and the second sealing disc consist of mutually different materials.

7. The sealing element as claimed in claim 4, wherein the inner ring and/or the intermediate ring are electrically conductive.

8. The sealing element as claimed in claim 1, wherein a radial shaft sealing ring is arranged on the inner ring.

9. The sealing element as claimed in claim 1, wherein an elastomer track is arranged on the inner ring.

10. The sealing element as claimed in claim 9, wherein the elastomer track forms a receptacle for the sealing disc.

11. The sealing element as claimed in claim 1, wherein the sealing disc comprises electrically conductive particles.

12. The sealing element as claimed in claim 1, wherein the sealing disc formed from non-woven fabric is provided with a PTFE dispersion.

* * * * *